US011842191B2

(12) United States Patent
Rosti et al.

(10) Patent No.: US 11,842,191 B2
(45) **Date of Patent: *Dec. 12, 2023**

(54) APPARATUS AND METHODS RELATED TO MICROCODE INSTRUCTIONS INDICATING INSTRUCTION TYPES

(71) Applicant: Micron Technology, Inc., Boise, ID (US)

(72) Inventors: Shawn Rosti, Eagle, ID (US); Timothy P. Finkbeiner, Boise, ID (US)

(73) Assignee: Micron Technology, Inc., Boise, ID (US)

(*) Notice: Subject to any disclaimer, the term of this patent is extended or adjusted under 35 U.S.C. 154(b) by 199 days.

This patent is subject to a terminal disclaimer.

(21) Appl. No.: 17/372,841

(22) Filed: Jul. 12, 2021

(65) Prior Publication Data

US 2021/0342148 A1 Nov. 4, 2021

Related U.S. Application Data

(63) Continuation of application No. 16/834,794, filed on Mar. 30, 2020, now Pat. No. 11,061,671, which is a (Continued)

(51) Int. Cl.
*G06F 9/30* (2018.01)
*G06F 9/26* (2006.01)
(Continued)

(52) U.S. Cl.
CPC .............. *G06F 9/261* (2013.01); *G06F 9/226* (2013.01); *G06F 9/28* (2013.01); *G06F 9/30145* (2013.01);
(Continued)

(58) Field of Classification Search
CPC ... G06F 9/30145; G06F 9/30185; G06F 9/226
See application file for complete search history.

(56) References Cited

U.S. PATENT DOCUMENTS 4,380,046 A 4/1983 Fung
4,435,792 A 3/1984 Bechtolsheim
(Continued)

FOREIGN PATENT DOCUMENTS

CN 102141905 8/2011
CN 103827817 5/2014
(Continued)

OTHER PUBLICATIONS

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

(Continued)

*Primary Examiner* — Jacob Petranek
(74) *Attorney, Agent, or Firm* — Brooks, Cameron & Huebsch, PLLC

(57) ABSTRACT

The present disclosure includes apparatuses and methods related to microcode instructions indicating instruction types. One example apparatus comprises a memory storing a set of microcode instructions. Each microcode instruction of the set can comprise a first field comprising a number of control data units, and a second field comprising a number of type select data units. Each microcode instruction of the set can have a particular instruction type defined by a value of the number of type select data units, and particular functions corresponding to the number of control data units are variable based on the particular instruction type.

20 Claims, 7 Drawing Sheets

Related U.S. Application Data continuation of application No. 15/245,776, filed on Aug. 24, 2016, now Pat. No. 10,606,587.

(51) Int. Cl.
*G06F 9/22* (2006.01)
*G06F 9/28* (2006.01)
*G06F 12/0875* (2016.01)

(52) U.S. Cl.
CPC ...... *G06F 9/30185* (2013.01); *G06F 12/0875* (2013.01); *G06F 2212/452* (2013.01)

(56) References Cited

U.S. PATENT DOCUMENTS 4,435,793 A 3/1984 Ochii
4,727,474 A 2/1988 Batcher
4,843,264 A 6/1989 Galbraith
4,958,378 A 9/1990 Bell
4,977,542 A 12/1990 Matsuda et al.
5,023,838 A 6/1991 Herbert
5,034,636 A 7/1991 Reis et al.
5,201,039 A 4/1993 Sakamura
5,210,850 A 5/1993 Kelly et al.
5,253,308 A 10/1993 Johnson
5,276,643 A 1/1994 Hoffman et al.
5,325,519 A 6/1994 Long et al.
5,367,488 A 11/1994 An
5,379,257 A 1/1995 Matsumura et al.
5,386,379 A 1/1995 Ali-Yahia et al.
5,398,213 A 3/1995 Yeon et al.
5,440,482 A 8/1995 Davis
5,446,690 A 8/1995 Tanaka et al.
5,473,576 A 12/1995 Matsui
5,481,500 A 1/1996 Reohr et al.
5,485,373 A 1/1996 Davis et al.
5,506,811 A 4/1996 McLaury
5,615,404 A 3/1997 Knoll et al.
5,638,128 A 6/1997 Hoogenboom
5,638,317 A 6/1997 Tran
5,654,936 A 8/1997 Cho
5,678,021 A 10/1997 Pawate et al.
5,724,291 A 3/1998 Matano
5,724,366 A 3/1998 Furutani
5,751,987 A 5/1998 Mahant-Shetti et al.
5,787,458 A 7/1998 Miwa
5,854,636 A 12/1998 Watanabe et al.
5,867,429 A 2/1999 Chen et al.
5,870,504 A 2/1999 Nemoto et al.
5,915,084 A 6/1999 Wendell
5,922,065 A 7/1999 Hull et al.
5,935,263 A 8/1999 Keeth et al.
5,986,942 A 11/1999 Sugibayashi
5,991,209 A 11/1999 Chow
5,991,785 A 11/1999 Alidina et al.
6,005,799 A 12/1999 Rao
6,009,020 A 12/1999 Nagata
6,092,186 A 7/2000 Betker et al.
6,122,211 A 9/2000 Morgan et al.
6,125,071 A 9/2000 Kohno et al.
6,134,164 A 10/2000 Lattimore et al.
6,147,514 A 11/2000 Shiratake
6,151,244 A 11/2000 Fujino et al.
6,157,578 A 12/2000 Brady
6,163,862 A 12/2000 Adams et al.
6,166,942 A 12/2000 Vo et al.
6,172,918 B1 1/2001 Hidaka
6,175,514 B1 1/2001 Henderson
6,181,698 B1 1/2001 Hariguchi
6,185,670 B1 2/2001 Huff et al.
6,208,544 B1 3/2001 Beadle et al.
6,226,215 B1 5/2001 Yoon
6,301,153 B1 10/2001 Takeuchi et al.
6,301,164 B1 10/2001 Manning et al.
6,304,477 B1 10/2001 Naji
6,389,507 B1 5/2002 Sherman
6,418,498 B1 7/2002 Martwick
6,466,499 B1 10/2002 Blodgett
6,510,098 B1 1/2003 Taylor
6,563,754 B1 5/2003 Lien et al.
6,578,058 B1 6/2003 Nygaard
6,731,542 B1 5/2004 Le et al.
6,754,746 B1 6/2004 Eung et al.
6,768,679 B1 7/2004 Le et al.
6,807,614 B2 10/2004 Chung
6,816,422 B2 11/2004 Hamade et al.
6,819,612 B1 11/2004 Achter
6,894,549 B2 5/2005 Eliason
6,943,579 B1 9/2005 Hazanchuk et al.
6,948,056 B1 9/2005 Roth
6,950,771 B1 9/2005 Fan et al.
6,950,898 B2 9/2005 Merritt et al.
6,956,770 B2 10/2005 Khalid et al.
6,961,272 B2 11/2005 Schreck
6,965,648 B1 11/2005 Smith et al.
6,985,394 B2 1/2006 Kim
6,987,693 B2 1/2006 Cernea et al.
7,020,017 B2 3/2006 Chen et al.
7,028,170 B2 4/2006 Saulsbury
7,045,834 B2 5/2006 Tran et al.
7,054,178 B1 5/2006 Shiah et al.
7,061,817 B2 6/2006 Raad et al.
7,062,526 B1 6/2006 Hoyle
7,079,407 B1 7/2006 Dimitrelis
7,173,857 B2 2/2007 Kato et al.
7,187,585 B2 3/2007 Li et al.
7,196,928 B2 3/2007 Chen
7,260,565 B2 8/2007 Lee et al.
7,260,672 B2 8/2007 Garney
7,372,715 B2 5/2008 Han
7,400,532 B2 7/2008 Aritome
7,406,494 B2 7/2008 Magee
7,447,720 B2 11/2008 Beaumont
7,454,451 B2 11/2008 Beaumont
7,457,181 B2 11/2008 Lee et al.
7,535,769 B2 5/2009 Cernea
7,546,438 B2 6/2009 Chung
7,562,198 B2 7/2009 Noda et al.
7,574,466 B2 8/2009 Beaumont
7,602,647 B2 10/2009 Li et al.
7,663,928 B2 2/2010 Tsai et al.
7,685,365 B2 3/2010 Rajwar et al.
7,692,466 B2 4/2010 Ahmadi
7,752,417 B2 7/2010 Manczak et al.
7,791,962 B2 9/2010 Noda et al.
7,796,453 B2 9/2010 Riho et al.
7,805,587 B1 9/2010 Van Dyke et al.
7,808,854 B2 10/2010 Takase
7,827,372 B2 11/2010 Bink et al.
7,869,273 B2 1/2011 Lee et al.
7,873,812 B1 1/2011 Mimar
7,898,864 B2 3/2011 Dong
7,924,628 B2 4/2011 Danon et al.
7,937,535 B2 5/2011 Ozer et al.
7,957,206 B2 6/2011 Bauser
7,979,667 B2 7/2011 Allen et al.
7,996,749 B2 8/2011 Ding et al.
8,042,082 B2 10/2011 Solomon
8,045,391 B2 10/2011 Mohklesi
8,059,438 B2 11/2011 Chang et al.
8,095,825 B2 1/2012 Hirotsu et al.
8,117,462 B2 2/2012 Snapp et al.
8,164,942 B2 4/2012 Gebara et al.
8,208,328 B2 6/2012 Hong
8,213,248 B2 7/2012 Moon et al.
8,223,568 B2 7/2012 Seo
8,238,173 B2 8/2012 Akerib et al.
8,274,841 B2 9/2012 Shimano et al.
8,279,683 B2 10/2012 Klein
8,310,884 B2 11/2012 Iwai et al.
8,332,367 B2 12/2012 Bhattacherjee et al.
8,339,824 B2 12/2012 Cooke
8,339,883 B2 12/2012 Yu et al.
8,347,154 B2 1/2013 Bahali et al.

(56) References Cited

U.S. PATENT DOCUMENTS 8,351,292 B2 1/2013 Matano
8,356,144 B2 1/2013 Hessel et al.
8,417,921 B2 4/2013 Gonion et al.
8,462,532 B1 6/2013 Argyres
8,484,276 B2 7/2013 Carlson et al.
8,495,438 B2 7/2013 Roine
8,503,250 B2 8/2013 Demone
8,526,239 B2 9/2013 Kim
8,533,245 B1 9/2013 Cheung
8,555,037 B2 10/2013 Gonion
8,599,613 B2 12/2013 Abiko et al.
8,605,015 B2 12/2013 Guttag et al.
8,625,376 B2 1/2014 Jung et al.
8,644,101 B2 2/2014 Jun et al.
8,650,232 B2 2/2014 Stortz et al.
8,873,272 B2 10/2014 Lee
8,947,438 B2 2/2015 Innerud et al.
8,964,496 B2 2/2015 Manning
8,971,124 B1 3/2015 Manning
9,015,390 B2 4/2015 Klein
9,047,193 B2 6/2015 Lin et al.
9,165,023 B2 10/2015 Moskovich et al.
9,747,105 B2 8/2017 Gopal et al.
2001/0007112 A1 7/2001 Porterfield
2001/0008492 A1 7/2001 Higashiho
2001/0010057 A1 7/2001 Yamada
2001/0028584 A1 10/2001 Nakayama et al.
2001/0043089 A1 11/2001 Forbes et al.
2002/0059355 A1 5/2002 Peleg et al.
2003/0167426 A1 9/2003 Slobodnik
2003/0222879 A1 12/2003 Lin et al.
2004/0073592 A1 4/2004 Kim et al.
2004/0073773 A1 4/2004 Demjanenko
2004/0085840 A1 5/2004 Vali et al.
2004/0095826 A1 5/2004 Perner
2004/0154002 A1 8/2004 Ball et al.
2004/0193784 A1 9/2004 Kirsch
2004/0205289 A1 10/2004 Srinivasan
2004/0240251 A1 12/2004 Nozawa et al.
2005/0015557 A1 1/2005 Wang et al.
2005/0055535 A1 3/2005 Moyer et al.
2005/0078514 A1 4/2005 Scheuerlein et al.
2005/0097417 A1 5/2005 Agrawal et al.
2005/0278504 A1 12/2005 Huang
2006/0047937 A1 3/2006 Selvaggi et al.
2006/0069849 A1 3/2006 Rudelic
2006/0146623 A1 7/2006 Mizuno et al.
2006/0149804 A1 7/2006 Luick et al.
2006/0181917 A1 8/2006 Kang et al.
2006/0215432 A1 9/2006 Wickeraad et al.
2006/0225072 A1 10/2006 Lari et al.
2006/0291282 A1 12/2006 Liu et al.
2007/0103986 A1 5/2007 Chen
2007/0150671 A1 6/2007 Kurland
2007/0171747 A1 7/2007 Hunter et al.
2007/0180006 A1 8/2007 Gyoten et al.
2007/0180184 A1 8/2007 Sakashita et al.
2007/0195602 A1 8/2007 Fong et al.
2007/0285131 A1 12/2007 Sohn
2007/0285979 A1 12/2007 Turner
2007/0291532 A1 12/2007 Tsuji
2008/0025073 A1 1/2008 Arsovski
2008/0037333 A1 2/2008 Kim et al.
2008/0052711 A1 2/2008 Forin et al.
2008/0082799 A1 4/2008 Bloomfield et al.
2008/0137388 A1 6/2008 Krishnan et al.
2008/0165601 A1 7/2008 Matick et al.
2008/0178053 A1 7/2008 Gorman et al.
2008/0215937 A1 9/2008 Dreibelbis et al.
2008/0294871 A1 11/2008 Pappalardo et al.
2009/0067218 A1 3/2009 Graber
2009/0154238 A1 6/2009 Lee
2009/0154273 A1 6/2009 Borot et al.
2009/0254697 A1 10/2009 Akerib
2010/0067296 A1 3/2010 Li
2010/0091582 A1 4/2010 Vali et al.
2010/0172190 A1 7/2010 Lavi et al.
2010/0210076 A1 8/2010 Gruber et al.
2010/0226183 A1 9/2010 Kim
2010/0308858 A1 12/2010 Noda et al.
2010/0332895 A1 12/2010 Billing et al.
2011/0051523 A1 3/2011 Manabe et al.
2011/0063919 A1 3/2011 Chandrasekhar et al.
2011/0093662 A1 4/2011 Walker et al.
2011/0103151 A1 5/2011 Kim et al.
2011/0119467 A1 5/2011 Cadambi et al.
2011/0122695 A1 5/2011 Li et al.
2011/0140741 A1 6/2011 Zerbe et al.
2011/0219260 A1 9/2011 Nobunaga et al.
2011/0267883 A1 11/2011 Lee et al.
2011/0317496 A1 12/2011 Bunce et al.
2012/0005397 A1 1/2012 Lim et al.
2012/0017039 A1 1/2012 Margetts
2012/0023281 A1 1/2012 Kawasaki et al.
2012/0120705 A1 5/2012 Mitsubori et al.
2012/0134216 A1 5/2012 Singh
2012/0134226 A1 5/2012 Chow
2012/0135225 A1 5/2012 Chow
2012/0140540 A1 6/2012 Agam et al.
2012/0182798 A1 7/2012 Hosono et al.
2012/0195146 A1 8/2012 Jun et al.
2012/0198310 A1 8/2012 Tran et al.
2012/0246380 A1 9/2012 Akerib et al.
2012/0265964 A1 10/2012 Murata et al.
2012/0281486 A1 11/2012 Rao et al.
2012/0303627 A1 11/2012 Keeton et al.
2013/0003467 A1 1/2013 Klein
2013/0061006 A1 3/2013 Hein
2013/0107623 A1 5/2013 Kavalipurapu et al.
2013/0117541 A1 5/2013 Choquette et al.
2013/0124783 A1 5/2013 Yoon et al.
2013/0132702 A1 5/2013 Patel et al.
2013/0138646 A1 5/2013 Sirer et al.
2013/0163362 A1 6/2013 Kim
2013/0173888 A1 7/2013 Hansen et al.
2013/0198497 A1 8/2013 Busaba et al.
2013/0205114 A1 8/2013 Badam et al.
2013/0219112 A1 8/2013 Okin et al.
2013/0227361 A1 8/2013 Bowers et al.
2013/0283122 A1 10/2013 Anholt et al.
2013/0286705 A1 10/2013 Grover et al.
2013/0326154 A1 12/2013 Haswell
2013/0332707 A1 12/2013 Gueron et al.
2014/0185395 A1 7/2014 Seo
2014/0215185 A1 7/2014 Danielsen
2014/0250279 A1 9/2014 Manning
2014/0344934 A1 11/2014 Jorgensen
2015/0029798 A1 1/2015 Manning
2015/0039855 A1 2/2015 Pechanek
2015/0042380 A1 2/2015 Manning
2015/0063052 A1 3/2015 Manning
2015/0078108 A1 3/2015 Cowles et al.
2015/0279466 A1 3/2015 Manning
2015/0120987 A1 4/2015 Wheeler
2015/0134713 A1 5/2015 Wheeler
2015/0270015 A1 9/2015 Murphy et al.
2015/0324290 A1 11/2015 Leidel et al.
2015/0325272 A1 11/2015 Murphy
2015/0356009 A1 12/2015 Wheeler et al.
2015/0356022 A1 12/2015 Leidel et al.
2015/0357007 A1 12/2015 Manning et al.
2015/0357008 A1 12/2015 Manning et al.
2015/0357019 A1 12/2015 Wheeler et al.
2015/0357020 A1 12/2015 Manning
2015/0357021 A1 12/2015 Hush
2015/0357022 A1 12/2015 Hush
2015/0357023 A1 12/2015 Hush
2015/0357024 A1 12/2015 Hush et al.
2015/0357047 A1 12/2015 Tiwari
2016/0062672 A1 3/2016 Wheeler
2016/0062673 A1 3/2016 Tiwari
2016/0062692 A1 3/2016 Finkbeiner et al.
2016/0062733 A1 3/2016 Tiwari
2016/0063284 A1 3/2016 Tiwari

(56) References Cited

U.S. PATENT DOCUMENTS

| | | | |
|---|---|---|---|
| 2016/0064045 | A1 | 3/2016 | La Fratta |
| 2016/0064047 | A1 | 3/2016 | Tiwari |
| 2016/0098208 | A1 | 4/2016 | Willcock |
| 2016/0098209 | A1 | 4/2016 | Leidel et al. |
| 2016/0110135 | A1 | 4/2016 | Wheeler et al. |
| 2016/0125919 | A1 | 5/2016 | Hush |
| 2016/0154596 | A1 | 6/2016 | Willcock et al. |
| 2016/0155482 | A1 | 6/2016 | La Fratta |
| 2016/0179514 | A1 | 6/2016 | Oron et al. |
| 2016/0188250 | A1 | 6/2016 | Wheeler |
| 2016/0196142 | A1 | 7/2016 | Wheeler et al. |
| 2016/0196856 | A1 | 7/2016 | Tiwari et al. |
| 2016/0225422 | A1 | 8/2016 | Tiwari et al. |
| 2017/0371739 | A1 | 12/2017 | Plondke |

FOREIGN PATENT DOCUMENTS

| | | |
|---|---|---|
| CN | 104679478 | 6/2015 |
| EP | 0214718 | 3/1987 |
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2008039908 | 4/2008 |
| WO | 2010079451 | 7/2010 |
| WO | 2013062596 | 5/2013 |
| WO | 2013081588 | 6/2013 |
| WO | 2013095592 | 6/2013 |
| WO | 2016126478 | 8/2016 |

OTHER PUBLICATIONS

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Application No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7. Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

EP Communication Pursuant to 94(3) EPC for related EP Application No. 17020379.8, dated Feb. 7, 2018, 8 pages.

European Search Report for related EP Application No. 17020379.8, dated Jan. 16, 2018, 4 pages.

Communication Pursuant to Article 94(3) EPC for related EP Application No. 17020379.8, dated Apr. 2, 2019, 13 pages.

Communication Pursuant to Article 94(3) EPC for related EP Application No. 17020379.8, dated Nov. 27, 2019, 10 pages.

Communication Pursuant to Article 94(3) EPC for related EP Application No. 17020379.8, dated Nov. 16, 2020, 7 pages.

Office Action for related China Patent Application No. 201710729456.5, dated Oct. 12, 2020, 23 pages.

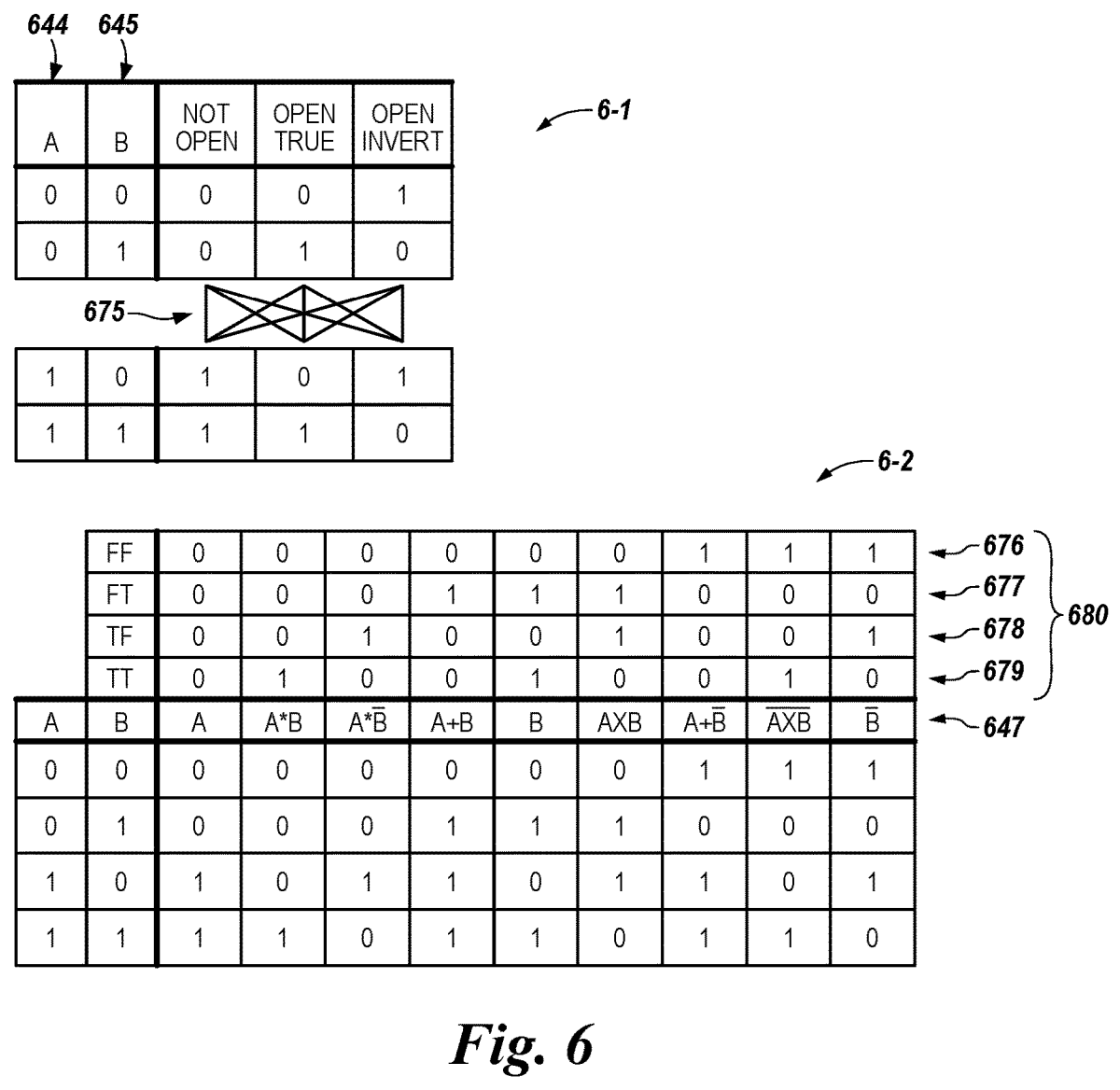

| A | B | NOT OPEN | OPEN TRUE | OPEN INVERT |
|---|---|---|---|---|
| 0 | 0 | 0 | 0 | 1 |
| 0 | 1 | 0 | 1 | 0 |
| 1 | 0 | 1 | 0 | 1 |
| 1 | 1 | 1 | 1 | 0 |

| | FF | 0 | 0 | 0 | 0 | 0 | 0 | 1 | 1 | 1 |
|---|---|---|---|---|---|---|---|---|---|---|
| | FT | 0 | 0 | 0 | 1 | 1 | 1 | 0 | 0 | 0 |
| | TF | 0 | 0 | 1 | 0 | 0 | 1 | 0 | 0 | 1 |
| | TT | 0 | 1 | 0 | 0 | 1 | 0 | 0 | 1 | 0 |
| A | B | A | A*B | $A^*\bar{B}$ | A+B | B | AXB | $A+\bar{B}$ | $\overline{AXB}$ | $\bar{B}$ |
| 0 | 0 | 0 | 0 | 0 | 0 | 0 | 0 | 1 | 1 | 1 |
| 0 | 1 | 0 | 0 | 0 | 1 | 1 | 1 | 0 | 0 | 0 |
| 1 | 0 | 1 | 0 | 1 | 1 | 0 | 1 | 1 | 0 | 1 |
| 1 | 1 | 1 | 1 | 0 | 1 | 1 | 0 | 1 | 1 | 0 |

*Fig. 6*

APPARATUS AND METHODS RELATED TO MICROCODE INSTRUCTIONS INDICATING INSTRUCTION TYPES

PRIORITY INFORMATION

This application is a Continuation of U.S. application Ser. No. 16/834,794, filed Mar. 30, 2020, which issues as U.S. Pat. No. 11,061,671 on Jul. 13, 2021, which is a Continuation of U.S. application Ser. No. 15/245,776, filed Aug. 24, 2016, which issues as U.S. Pat. No. 10,606,587 on Mar. 31, 2020, the contents of which are included herein by reference.

TECHNICAL FIELD

The present disclosure relates generally to semiconductor memory and methods, and more particularly, to apparatuses and methods related to microcode instructions indicating instruction types.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions. Executing instructions can involve performance of various operations, which may include the storing of results to a suitable location, for example. The instructions can be in the form of microcode instructions, which can be stored in memory (e.g., Read Only Memory (ROM), RAM, etc.) accessible by a processing resource. A processor can comprise a number of functional units such as arithmetic logic unit (ALU) circuitry, floating point unit (FPU) circuitry, and a combinatorial logic block, for example, which can be used to execute microcode instructions to perform various operations. As an example, each microcode instruction can comprise a number of data units (e.g., bits) used to control various components within a computing system (e.g., ALUs, registers, I/O circuitry, etc.). For example, a microcode instruction may translate higher level machine code into sequences of circuit-level operations. In various instances, a single microcode instruction can specify a number of particular operations. For instance, the bits of a single microcode instruction may indicate a number of settings of an ALU (e.g., whether the ALU's carry input is set to zero, whether the ALU is set for two's complement functions, etc.), update status flags within the ALU, indicate a particular register to which a result is to be stored, may indicate the location of a next microcode instruction, indicate parity for the microcode instruction, and/or may indicate which particular register of a set of registers is to be coupled to the ALU, etc., among various other functions. In this manner, various sequences of a set of microcode instructions can be executed to perform a number of basic operations, which may include, for example, performing operations such as arithmetic operations (e.g., addition, subtraction, multiplication, division, etc.) on data (e.g., operands) via a number of logical operations such as AND, OR, NOT, NAND, NOR, and XOR, and invert (e.g., binary inversion).

The size (e.g., number of bits) of the microcode instructions can vary depending on the particular computing system, for example. For instance, in order for a microcode instruction to control all of the desired functions within a computing system (or particular portion thereof), each microcode instruction can comprise a particular number of control data units (e.g., 90 bits, 108 bits, 160 bits, etc.). As such, microcode instruction size can affect the amount of memory needed to store and/or execute the microcode within a computing system.

BRIEF DESCRIPTION OF THE DRAWINGS

FIG. 6 is a logic table illustrating selectable logic operation results implemented by a sensing circuitry in accordance with a number of embodiments of the present disclosure.

DETAILED DESCRIPTION

Figure 1A:
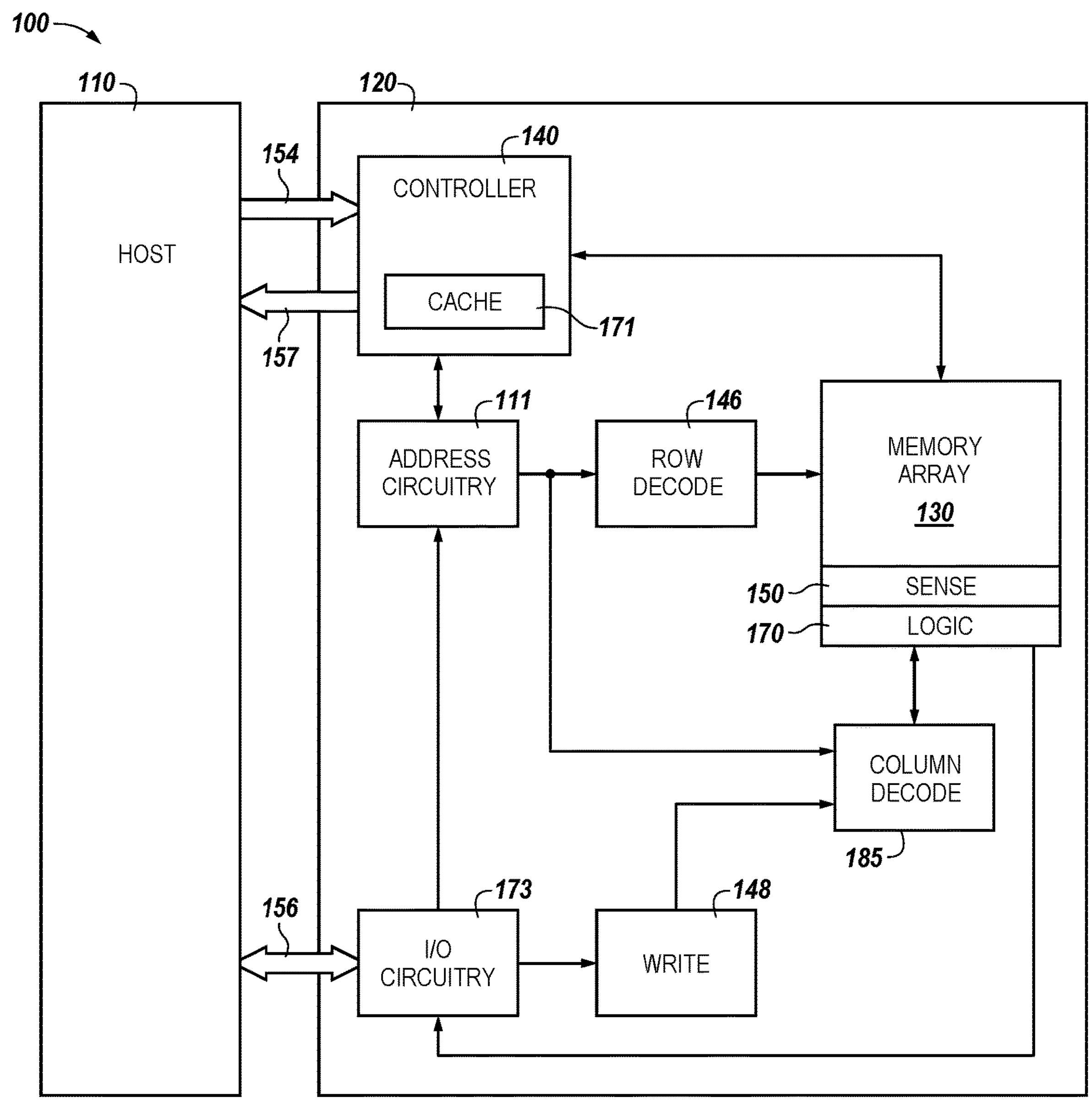
FIG. 1A is a block diagram of an apparatus in the form of a computing system including a memory device in accordance with a number of embodiments of the present disclosure.

The present disclosure includes apparatuses and methods related to microcode instructions. One example apparatus comprises a memory storing a set of microcode instructions. Each microcode instruction of the set can comprise a first field comprising a number of control data units, and a second field comprising a number of type select data units. Each microcode instruction of the set has a particular instruction type indicated by a value of the number of type select data units, and particular functions corresponding to the number of control data units are variable based on the particular instruction type.

Embodiments of the present disclosure can provide benefits such as reducing a size of a single microcode instruction (e.g., a microcode word). As an example, consider a system in which a number of microcode instructions (e.g., a sequence of microcode instructions) are retrieved (e.g., from memory) for execution (e.g., by a processing resource). The memory can often provide limited space to store the number of microcode instructions. A number of embodiments of the present disclosure can provide benefits such as reducing the size (e.g., quantity of data units) of microcode instructions, as compared to previous approaches, without sacrificing the functional capabilities of the microcode instructions, among various other benefits. Reducing the size of microcode instructions, while maintaining functional capability, can provide benefits such as reducing the amount of memory capacity needed to store the microcode and/or can increase the number of microcode instructions storable in a given location (e.g., cache), which may have limited storage capacity.

As described further herein, a number of embodiments include microcode instructions having control data units and type select data units. The control data units can be used to control various functions (e.g., via control signals provided to system components) of a computing system based on their values. The values of the type select data units indicate a particular instruction type corresponding to the microcode instruction. In a number of embodiments, the particular functions controlled by the constituent control data units of a microcode instruction depend on the values of the type select data unit(s) (e.g., on the particular instruction type). For example, if the type select data units of a first microcode instruction have a first value, then a first group of the control data units (e.g., the least significant 8 bits) corresponding to the first microcode instruction might be used to control selection of a particular register. However, if the type select data units of a second (e.g., different) microcode instruction have a different value, then the first group of control data units (e.g., the same least significant 8 bits) corresponding to the second microcode instruction might be used to control one or more different memory functions (e.g., program counter operations rather than register selection).

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, designators such as "N", particularly with respect to reference numerals in the drawings, indicate that a number of the particular feature so designated can be included. As used herein, "a number of" a particular thing refers to one or more of such things (e.g., a number of memory arrays can refer to one or more memory arrays). A "plurality of" a particular thing is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 130 may reference element "30" in FIG. 1, and a similar element may be referenced as 430 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1A is a block diagram of an apparatus in the form of a computing system 100 including a memory device 120 in accordance with a number of embodiments of the present disclosure. As used herein, a memory device 120, controller 140, memory array 130, sensing circuitry 150, logic circuitry 170, and/or cache 171 might also be separately considered an "apparatus."

System 100 includes a host 110 coupled (e.g., connected) to memory device 120, which includes a memory array 130. Host 110 can be a host system such as a personal laptop computer, a desktop computer, a digital camera, a smart phone, or a memory card reader, among various other types of hosts. Host 110 can include a system motherboard and/or backplane and can include a number of processing resources (e.g., one or more processors, microprocessors, etc.). A more detailed diagram of one example of host 110 is described in association with FIG. 1C.

The system 100 can include separate integrated circuits or both the host 110 and the memory device 120 can be on the same integrated circuit. The system 100 can be, for instance, a server system and/or a high performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines, which may be referred to herein as word lines and/or select lines, and columns coupled by sense lines, which may be referred to herein as data lines and/or digit lines. Although a single array 130 is shown in FIG. 1, embodiments are not so limited. For instance, memory device 120 may include a number of arrays 130 (e.g., a number of banks of DRAM cells, NAND flash cells, etc.). Additionally, although not shown, a plurality of memory devices 120 can be coupled to host 110 via a respective plurality of memory channels.

The memory device 120 includes address circuitry 111 to latch address signals provided over a bus 156 through I/O circuitry 173. Bus 156 can serve as a data bus (e.g., an I/O bus) and as an address bus; however, embodiments are not so limited. Status and/or exception information can be provided from the controller 140 on the memory device 120 to host 110 through a high speed interface (HSI), which can include an out-of-band bus 157. Address signals can be received through address circuitry 111 and decoded by a row decoder 146 and a column decoder 185 to access the memory array 130. Data can be read from memory array 130 by sensing voltage and/or current changes on the data lines using sensing circuitry 150. The sensing circuitry 150 can read and latch a page (e.g., row) of data from the memory array 130. The I/O circuitry 173 can be used for bi-directional data communication with host 110 over the data bus 156. The write circuitry 148 can be used to write data to the memory array 130.

Controller 140 decodes signals provided by control bus 154 from the host 110. These signals can include chip enable signals, write enable signals, and address latch signals that are used to control operations performed on the memory array 130, including data read, data write, and data erase operations. In various embodiments, the controller 140 is responsible for executing instructions from the host 110 and sequencing access to the array 130, among other functions. For example, executing instructions from host 110 can include performing operations (e.g., by executing microcode instructions) using processing resources corresponding to the sensing circuitry 150 and/or logic 170, as described further herein. The controller 140 can include a state machine (e.g., firmware and/or hardware in the form of an application specific integrated circuit (ASIC)), a sequencer, and/or some other type of controlling circuitry. In the example shown in FIG. 1A, the controller 140 includes a cache 171, which may store (e.g., at least temporarily) microcode instructions in accordance with a number of embodiments described herein executable (e.g., by a processing resource associated with controller 140 and/or host 110) to perform memory operations. A more detailed diagram of one example of controller 140 is described in association with FIG. 1B.

As described further below, in a number of embodiments, the sensing circuitry 150 can comprise a number of sense amplifiers and a number of compute components, which may serve as, and be referred to herein as an accumulator, and can be used to perform various memory operations (e.g., to perform logical operations on data associated with complementary sense lines). In a number of embodiments, storage locations (e.g., latches) corresponding to the compute components can serve as stages of a shift register. For example, clock signals can be applied to the compute components to shift data from one compute component to an adjacent compute component.

In a number of embodiments, the sensing circuitry 150 can be used to perform logical operations using data stored in array 130 as inputs and store the results of the logical operations back to the array 130 without transferring data via a sense line address access (e.g., without firing a column decode signal). As such, various compute functions can be performed using, and within, sensing circuitry 150 rather than (or in association with) being performed by processing resources external to the sensing circuitry (e.g., by a processor associated with host 110 and/or other processing circuitry, such as ALU circuitry, located on device 120 (e.g., on controller 140 or elsewhere)).

In various previous approaches, data associated with an operand, for instance, would be read from memory via sensing circuitry and provided to external ALU circuitry via I/O lines (e.g., via local I/O lines and/or global I/O lines). The external ALU circuitry could include a number of registers and would perform compute functions using the operands, and the result would be transferred back to the array via the I/O lines. In contrast, in a number of embodiments of the present disclosure, sensing circuitry 150 is configured to perform logical operations on data stored in memory array 130 and store the result back to the memory array 130 without enabling an I/O line (e.g., a local I/O line) coupled to the sensing circuitry 150. The sensing circuitry 150 can be formed on pitch with the sense lines of the array. For example, the cells of memory array may have a particular cell size (e.g., $4F^2$ or $6F^2$, where "F" is a feature size corresponding to the cells). As described further below, in a number of embodiments, sensing components (e.g., respective sense amplifier and compute component pairs) corresponding to sensing circuitry 150 are formed on a same pitch as sense lines of the array and can be operated to perform various compute functions. For instance, if the sense line pitch is 3F, the transistors of the sensing components can fit within the same 3F pitch. In contrast, the devices (e.g., logic gates) associated with ALU circuitry of various processor-in-memory (PIM) systems may not be capable of being formed on pitch with the sense lines, which can increase chip size and/or memory density as compared to a number of embodiments of the present disclosure, for example. Additional logic circuitry 170 can be coupled to the sensing circuitry 150 and can be used to store (e.g., cache and/or buffer) results of operations described herein.

As such, in a number of embodiments, circuitry external to array 130 and sensing circuitry 150 is not needed to perform compute functions as the sensing circuitry 150 can perform the appropriate logical operations to perform such compute functions without the use of an external processing resource. In a number of embodiments, the sensing circuitry 150 can be operated as a number of 1-bit processing resources, with the sensing components coupled to respective columns of the array 130 serving as respective 1-bit processing elements. Therefore, the sensing circuitry 150 may be used to complement and/or to replace, at least to some extent, an external processing resource such as ALU circuitry of a host.

Enabling an I/O line can include enabling (e.g., turning on) a transistor having a gate coupled to a decode signal (e.g., a column decode signal) and a source/drain coupled to the I/O line. However, embodiments are not limited to performing logical operations using sensing circuitry (e.g., 150) without enabling column decode lines of the array. Whether or not local I/O lines are used in association with performing logical operations via sensing circuitry 150, the local I/O line(s) may be enabled in order to transfer a result to a suitable location other than back to the array 130 (e.g., to an external register).

Figure 1B:
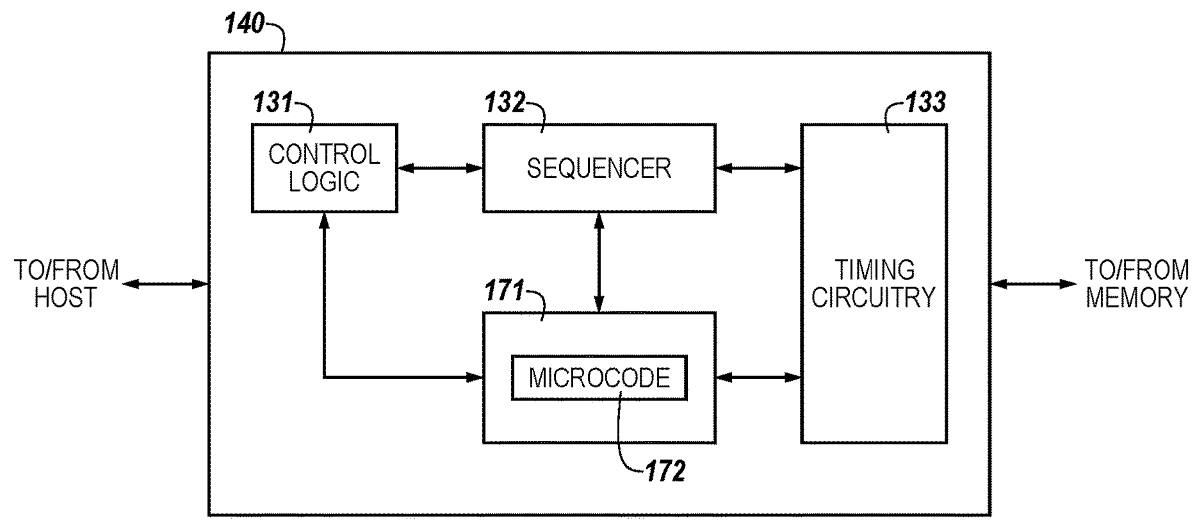
FIG. 1B is a block diagram in greater detail of the controller shown in FIG. 1A in accordance with a number of embodiments of the present disclosure.

FIG. 1B is a block diagram in greater detail of the controller 140 shown in FIG. 1A in accordance with a number of embodiments of the present disclosure. In the example shown in FIG. 1B, the controller 140 is shown comprising control logic 131, sequencer 132, and timing circuitry 133.

As an example, the control logic 131 can comprise a number of components (e.g., program counters, registers, ALUs, branching logic, state machines, etc.) configured to control fetching and executing instructions (e.g., microcode instructions 172). For instance, microcode instructions 172 can be fetched from a memory array (e.g., 130) and/or from a host (e.g., 110) and can be stored in a cache (e.g., cache 171) for execution. In a number of embodiments, the control logic 131 may decode microcode instructions for execution by sequencer 132.

The sequencer 132 may also comprise a number of components (e.g., a number of FIFO buffers, program counter logic, branch logic, registers, microcode instruction cache, ALU, state machines, etc.) configured to execute microcode instructions (e.g., microcode 172) and can report status information such as error conditions detected in the microcode instructions, invalid circuit states, etc. The microcode instructions 172 (e.g., the microcode words) can comprise bits whose values control particular components within the controller 140 (e.g., various ALUs, registers, etc.) as well as components outside of the controller 140 (e.g., sensing circuitry 150, logic 170, decode circuitry 146/185, etc.) to perform various memory operations.

The timing circuitry 133 may comprise a number of components (e.g., state machines, FIFO buffers, a row address strobe chain interface, etc.) to provide timing to coordinate conflict free access to memory such as array 130. As an example, the timing circuitry 133 can coordinate timing between execution of microcode instructions associated with performing logical operations using sensing circuitry 150 and execution of microcode instructions associated with transferring data from array 130 to an external processing resource (e.g., to controller 140 and/or to host 110).

For example, the controller 140 may execute microcode instructions 172 to control regular operations (e.g., writes, reads, copies, erase, etc.) on memory array 130. Additionally, the controller 140 can execute microcode instructions 172 to control sensing circuitry 150 in association with performing various operations (e.g., mathematical operations such as addition, multiplication, etc., by performing Boolean AND operations, OR operations, invert operations, shift operations, etc.) using respective sensing components as processing resources such as described further below.

As such, the controller 140 (e.g., control logic 131, sequencer 132, and timing circuitry 133) may operate to execute sets (e.g., sequences) of microcode instructions 172 to perform various memory operations (e.g., on array 130). As an example, a particular set of microcode instructions can be executed (e.g., by controller 140) to perform, in parallel, a number of mathematical operations on data elements stored (e.g., as vectors) in array 130.

Figure 1C:
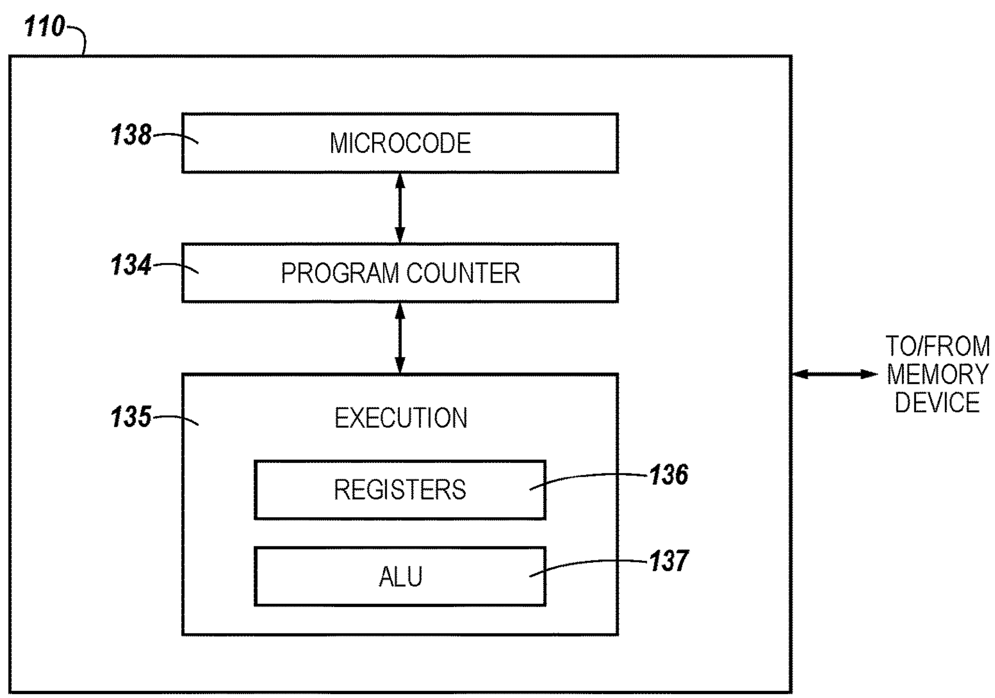
FIG. 1C is a block diagram in greater detail of the host shown in FIG. 1A in accordance with a number of embodiments of the present disclosure.

FIG. 1C is a block diagram in greater detail of the host 110 shown in FIG. 1A in accordance with a number of embodiments of the present disclosure. The host 110 can be, for example, a processor (e.g., a CPU), which can comprise various functional unit circuitry. In this example, the host 110 includes a program counter 134 that can fetch instructions, such as microcode instructions 138 for execution by execution unit 135. The microcode instructions 138 can comprise a number of sets of microcode instructions that may be executed (e.g., in a particular sequence) to perform various memory operations (e.g., in association with executing a program).

Execution of microcode instructions 138 can, for example, control various functions of the program counter 134 (e.g., incrementing the program counter), as well as various functions of other functional unit circuitry of host 110. For instance, in this example, execution unit 135 comprises a number of registers 136 and an ALU 137, whose functions may be controlled by control data units of the microcode instructions 138. The microcode instructions 138 may also be executed to control I/O operations between a number of memory devices (e.g., memory device 120) and the host 110 (e.g., via a bus such as bus 156 shown in FIG. 1A). The microcode instructions 138 can be microcode instructions such as those described below in association with FIG. 2B, for example. The microcode instructions 138 can be stored in memory on host 110 and/or may be retrieved from memory (e.g., memory 130) located on a memory device (e.g., memory device 120) for execution local to host 110.

Figure 2A:
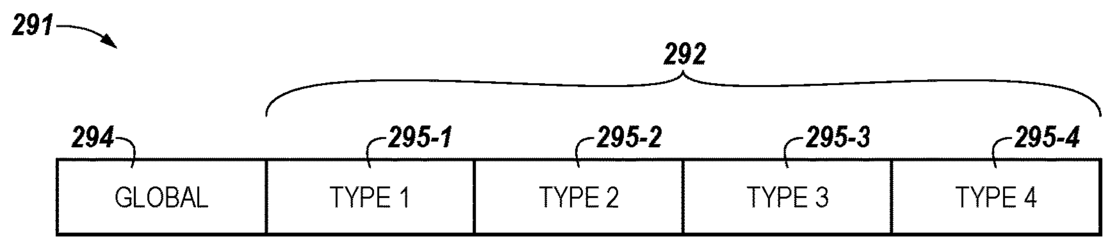
FIG. 2A illustrates a microcode instruction in accordance with previous approaches.
Figure 2B:
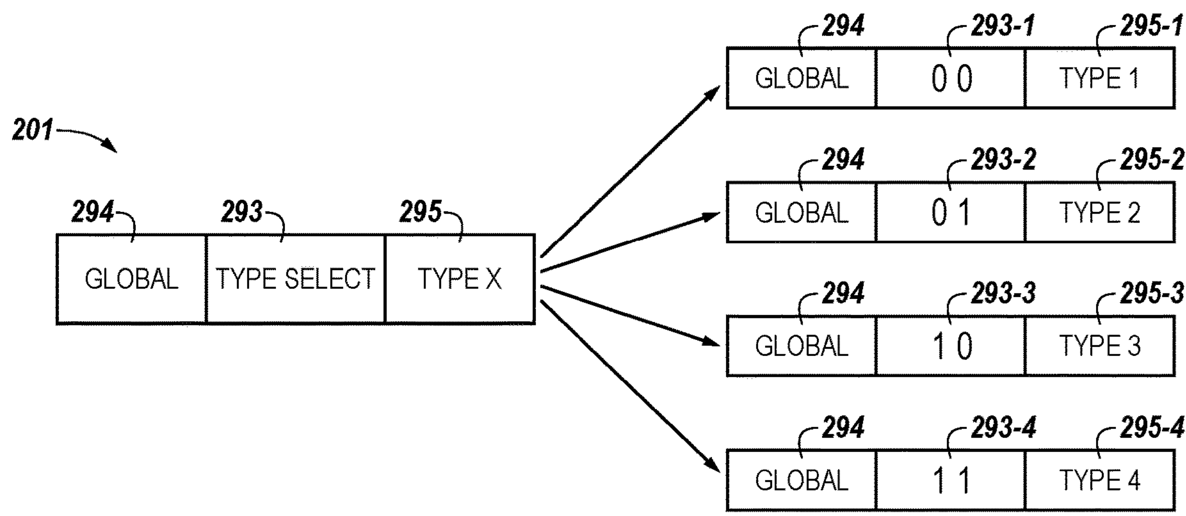
FIG. 2B illustrates a microcode instruction in accordance with a number of embodiments of the present disclosure.

FIG. 2A illustrates a microcode instruction 291 in accordance with previous approaches. FIG. 2B illustrates a microcode instruction in accordance with a number of embodiments of the present disclosure.

The example microcode instruction 291 illustrated in FIG. 2A can be referred to as a microcode word 291 and comprises a number of data units (e.g., bits). In this example, the microcode word 291 includes a field 292 comprising a number of control data units and a field 294 (GLOBAL) comprising a number of global data units. The microcode word 291 can comprise, for example 160 bits with 32 global bits and 128 control bits 292. The quantity of bits of the word 291 (e.g., its size) and/or the particular quantity of global bits (e.g., the size of field 294) and control bits 292 (e.g., the size of field 292) can depend on a particular system. For example, one particular system might be configured to execute 90 bit microcode instructions, which may or may not include any global bits, while another system might be configured to execute 108 bit microcode instructions comprising 92 control bits and 16 global bits. In various instances, the size of the microcode words 291 of a system depends on the quantity of bits needed to encode all of the possible instructions used to perform a desired set of memory operations. For instance, in order to perform a given set operations (e.g., arithmetic operations, bit shifting, etc.) associated with executing a program, for example, 128 bits may be needed in order to encode all of the possible microcode instructions (e.g., in order to control all of the system components associated with performing the desired set of memory operations). As noted above, each bit, or groups of bits, of a microcode word (e.g., word 291) can be used to control different system components (e.g., registers, ALUs, I/O lines, program counters, drivers, etc.).

The global bits of field 294 may include, for example, a number of parity bits and/or error correcting code (ECC) bits corresponding to the word 291, a number of bits associated with microcode error messages, and/or a number of bits associated with microcode debugging. The control bits of field 292 are used to control various components within a computing system in association with performing operations.

In various instances, certain types (e.g., categories) of microcode instructions are not, or cannot, be executed simultaneously. For example, a microcode instruction 291 associated with resetting a system (or resetting a number of particular system components) might not be executable at the same time as a microcode instruction 291 associated with performing an arithmetic operation. Additionally, although each microcode instruction 291 comprises a same quantity of control bits (e.g., the size of field 292 is consistent), various control bits remain unused depending on the type of operation implemented by a particular microcode word 291. For example, a first operation of a first type (e.g., an I/O operation) might be controlled via a first group of the control bits 292, while a second operation of a second type (e.g., an arithmetic operation) might be controlled via a different group of the control bits 292.

In the example shown in FIG. 2A, the control bit field 292 of microcode word 291 comprises a number of fields 295-1 (TYPE 1), 295-2 (TYPE 2), 295-3 (TYPE 3), and 295-4 (TYPE 4) associated with performing different types of operations. As an example, the bits of field 295-1 might be associated with performing mathematic (e.g., arithmetic) operations, the bits of field 295-2 might be associated with performing program counter control operations, the bits of field 295-3 might be associated with performing I/O operations, and the bits of field 295-4 might be associated with performing Boolean operations using sensing circuitry (e.g., 150) as processing components. Since performing the different operation types can be associated with controlling respective different circuitry (e.g., hardware components) within a system (e.g., 100) and/or device (120), the groups of bits corresponding to respective fields 295-1, 295-2, 295-3, and 295-4 can correspond to control of different respective groups of circuitry.

Although the fields 295-1, 295-2, 295-3, and 295-4 are illustrated as being organized sequentially in FIG. 2A, the fields and/or their constituent bits can be at non-sequential bit positions among the control bits 292. Although not shown in FIG. 2A, each of the fields 295-1, 295-2, 295-3, and 295-4 can comprise a number of fields (e.g., sub-fields) corresponding to their different constituent control bits (e.g., fields comprising bits corresponding to control of particular components such as address fields corresponding to operand addresses, register addresses, program counter addresses, among various other fields). Also, although the control bits of field 292 are organized into four different operation types in FIG. 2A, embodiments of the present disclosure are not limited to a particular number of operations types. For example, the control bits 292 might be organized into more or fewer than four "type" fields corresponding to respective different operation types.

As noted above, the size of field 292 can correspond to the quantity of bits used to perform any one of a set of operations (e.g., any desired operation independent of the particular operation type). However, only a subset (e.g., 295-1, 295-2, 295-3, and 295-4) of the control bits 292 might be associated with performing a selected operation. For instance, in various previous approaches, performing each operation involves fetching and executing a whole word 291 even though several of the bits 292 do not affect components associated with performing the particular operation (e.g., the components affected by the control bits of fields 295-1, 295-2, and 295-3 are not the same as the components affected by the control bits of field 295-4 associated with performing an operation corresponding to type 4).

FIG. 2B illustrates a microcode instruction 201 in accordance with a number of embodiments of the present disclosure. Similar to the microcode instruction 291 illustrated in FIG. 2A, the microcode instruction 201 can be referred to as a microcode word 201 and comprises a number of data units (e.g., bits). In this example, the microcode word 201 includes a field 295 (TYPE X) comprising a number of control bits, a field 293 (TYPE SELECT) comprising a number of type select bits, and a field 294 (GLOBAL) comprising a number of global bits. The function of the global bits of field 294 in microcode word 201 can be similar to the function of the global bits of microcode word 291 (e.g., parity, ECC, debugging, error messages, etc.).

Unlike the microcode word 291 shown in FIG. 2A, in which the particular functions corresponding to the control bits within field 292 are not variable (e.g., they remain static), the particular functions corresponding to the control bits within field 295 of microcode word 201 are variable. For example, the particular functions corresponding to the control bits of field 295 are variable based on the type select bits of field 293. In accordance with a number of embodiments, the type select bits of field 293 indicate a particular operation type of a number of operation types implemented by the control bits of field 295. For instance, the type select bits can be used to select between different operation types implementable via a single microcode word 201, which can reduce the size of microcode words (e.g., as compared to the size of previous microcode words such as word 291 described in FIG. 2A). To further illustrate the variable nature of the control bits of field 295 of microcode word 201, as compared to the static nature of the control bits of field 292 of microcode word 291, consider the following. If we consider sixteen bits at sixteen respective bit positions within field 292 of word 291, the functions of those sixteen bits (e.g., the respective control signals corresponding to the bit values and/or the respective hardware components controlled thereby) remain the same independent of which operation type (e.g., TYPE 1, TYPE 2, TYPE 3, and TYPE 4) the word 291 is configured to implement. In contrast, if we consider sixteen bits at sixteen respective bit positions within field 295 of word 201, the functions of those sixteen bits (e.g., the respective control signals corresponding to the bit values and/or the respective hardware components controlled thereby) change depending on the value of the type select bits of field 293. For example, if the type select bits have a first value (e.g., "00"), the sixteen bits might correspond to controlling one or more particular registers, and if the type select bits have a second value (e.g., "11"), the same sixteen bits might correspond to controlling one or more program counters.

In the example shown in FIG. 2B, the type select field 293 comprises two type select bits, whose values can be used to indicate one of four different operation types corresponding to field 295. For instance, as shown in FIG. 2B, the control bits of field 295 can correspond to one of four different operation types (e.g., TYPE 1, TYPE 2, TYPE 3, and TYPE 4) depending on the values of the bits of field 293. In this example, the type select bits of field 293 having a value of "00" (e.g., as shown in field 293-1) indicates that the control bits of field 295 correspond to an operation of TYPE 1 (e.g., as shown in field 295-1). The type select bits of field 293 having a value of "01" (e.g., as shown in field 293-2) indicates that the control bits of field 295 correspond to an operation of TYPE 2 (e.g., as shown in field 295-2). The type select bits of field 293 having a value of "10" (e.g., as shown in field 293-3) indicates that the control bits of field 295 correspond to an operation of TYPE 3 (e.g., as shown in field 295-3). Also, the type select bits of field 293 having a value of "11" (e.g., as shown in field 293-4) indicates that the control bits of field 295 correspond to an operation of TYPE 4 (e.g., as shown in field 295-4).

Using type select bits to indicate the particular operation type to which the control bits correspond can provide benefits such as reducing the size of a microcode word (e.g., 201) as compared to the size of previous microcode words (e.g., 291). For instance, if the size of field 292 of microcode word 291 is 128 bits (e.g., with each of fields 295-1 to 295-4 comprising 32 bits), then performing a single microcode operation of each type (e.g., TYPE 1, TYPE 2, TYPE 3, and TYPE 4) would involve fetching and executing four microcode words 291 each comprising 128 control bits (plus a number of global bits). In contrast, the two select bits of field 293 can be used to select between the four different operation types such that performing a single microcode operation of each type would involve fetching and executing four microcode words 201 each comprising 32 control bits and 2 type select bits (plus a number of global bits). Since the inclusion of a type select field 293 reduces the size of the microcode words, a particular memory location (e.g., cache) can store more microcode words 201 as compared to microcode words 291, which can increase the speed and/or efficiency of a computing system, among other benefits.

Embodiments are not limited to the example shown in the FIG. 2B. For instance, the type select field 293 can comprise more or fewer than two bits. For instance, as described further in association with FIG. 3, the type select field 293 can comprise a single bit whose value (e.g., "1" or "0") can be used to select between two different operation types, or more than two bits can be used to select between multiple (e.g., $2^N$ where N is the quantity of type select bits) different operation types.

Figure 3:
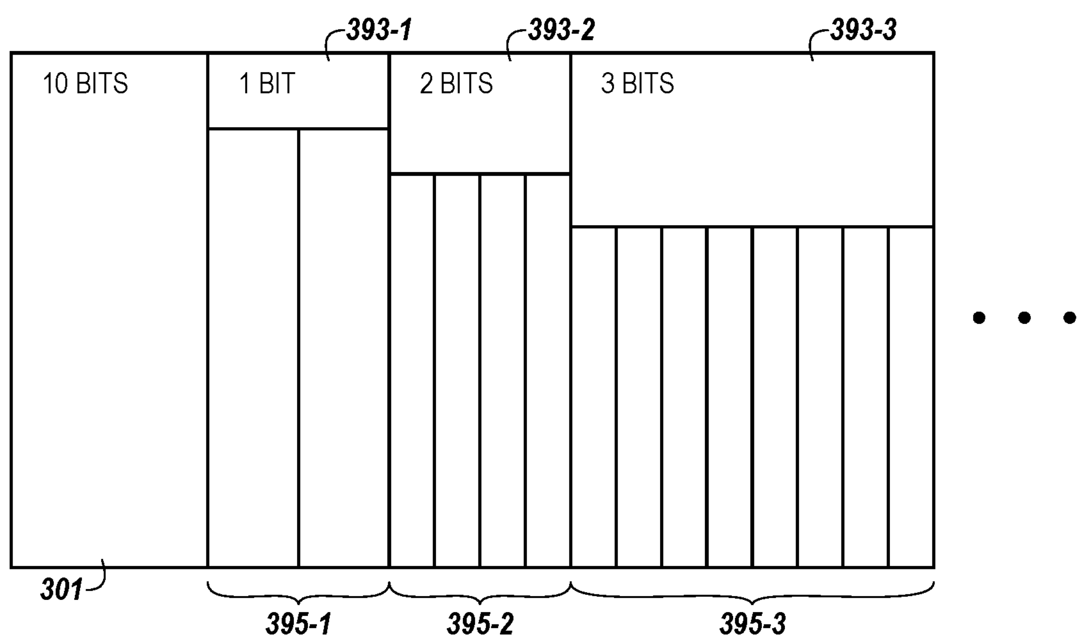
FIG. 3 illustrates a number of microcode instructions with various number of type select data units in accordance with a number of embodiments of the present disclosure.

FIG. 3 illustrates a table showing different numbers of type select bits and control bits for a microcode instruction having a particular size in accordance with a number of embodiments of the present disclosure. The table shown in FIG. 3 assumes a microcode instruction size of 10 bits. Accordingly, as shown in FIG. 2, assuming none of the 10 bits are used as type select bits, the microcode word 301 comprises zero type select bits. However, if one of the 10 bits is used as a type select bit (e.g., field 393-1 comprises one bit), then the type select bit can be used to select between two different operation types corresponding to operation type field 395-1, which comprises 9 bits (e.g., 10 total bits—1 type select bit). If two of the 10 bits are used as type select bits (e.g., field 393-2 comprises two bits), then the type select bits can represent four different values and, as such, can be used to select from among four different operation types corresponding to operation type field 395-2, which comprises 8 bits (e.g., 10 total bits—2 type select bits). If three of the 10 bits are used as type select bits (e.g., field 393-3 comprises three bits), then the type select bits can represent eight different values and, as such, can be used to select from among up to eight different operation types corresponding to operation type field 395-3, which comprises 7 bits (e.g., 10 total bits—3 type select bits).

In this manner, a 10-bit microcode instruction comprising zero type select bits (e.g., instruction 301) could comprise 10 control bits configured to perform 10 different functions (e.g., to control 10 different hardware components). In contrast, for a 10-bit microcode instruction comprising a 2-bit type select field (e.g., 393-2) the 8 remaining control bits could be configured to perform up to 32 different functions depending on the values of the type select bits (e.g., each of the 8 control bits could correspond to a different hardware component, or portion thereof, depending on the particular values of the two type select bits). Similarly, for a 10-bit microcode instruction comprising a 3-bit type select field (e.g., 393-3) the 7 remaining control bits could be configured to perform up to 56 different functions depending on the values of the type select bits (e.g., each of the 7 control bits could correspond to a different hardware component, or portion thereof, depending on the particular values of the three type select bits). As described in association with FIG. 2B, in a number of embodiments, the different values of the bits within the type select fields (e.g., 393-1, 393-2, and 393-3) can correspond to respective different operation types. For instance, a first value might correspond to arithmetic functions, a second value might correspond to program counter operations, a third value might correspond to I/O operation, a fourth value might correspond to Boolean operations, etc. However, embodiments are not limited to particular operation types.

Including type select bits within microcode instructions in accordance with embodiments described herein can provide benefits such as reducing the size of microcode words associated with performing particular operations. For instance, a prior art microcode instruction set might comprise microcode words comprising 128 control bits used to perform four different operation types. As an example, each of four different groups of the control 128 bits (e.g., four groups of 32 bits) can correspond to the four different operation types. As such, performing an operation from each of the four different operation types would include fetching and executing four different microcode words each comprising 128 control bits (plus additional global bits). In contrast, a microcode instruction set in accordance with the present disclosure might comprise microcode words comprising 32 control bits and two type select bits used to select between four different operation types. Accordingly, in this example, performing an operation from each of the four different operation types would include fetching and executing four different microcode words each comprising 32 control bits (plus additional global bits and the two type select bits). Therefore, the reduced size of microcode words as compared to prior art microcode words can result in the ability to store more microcode words in a given amount of memory, among other benefits.

Figure 4:
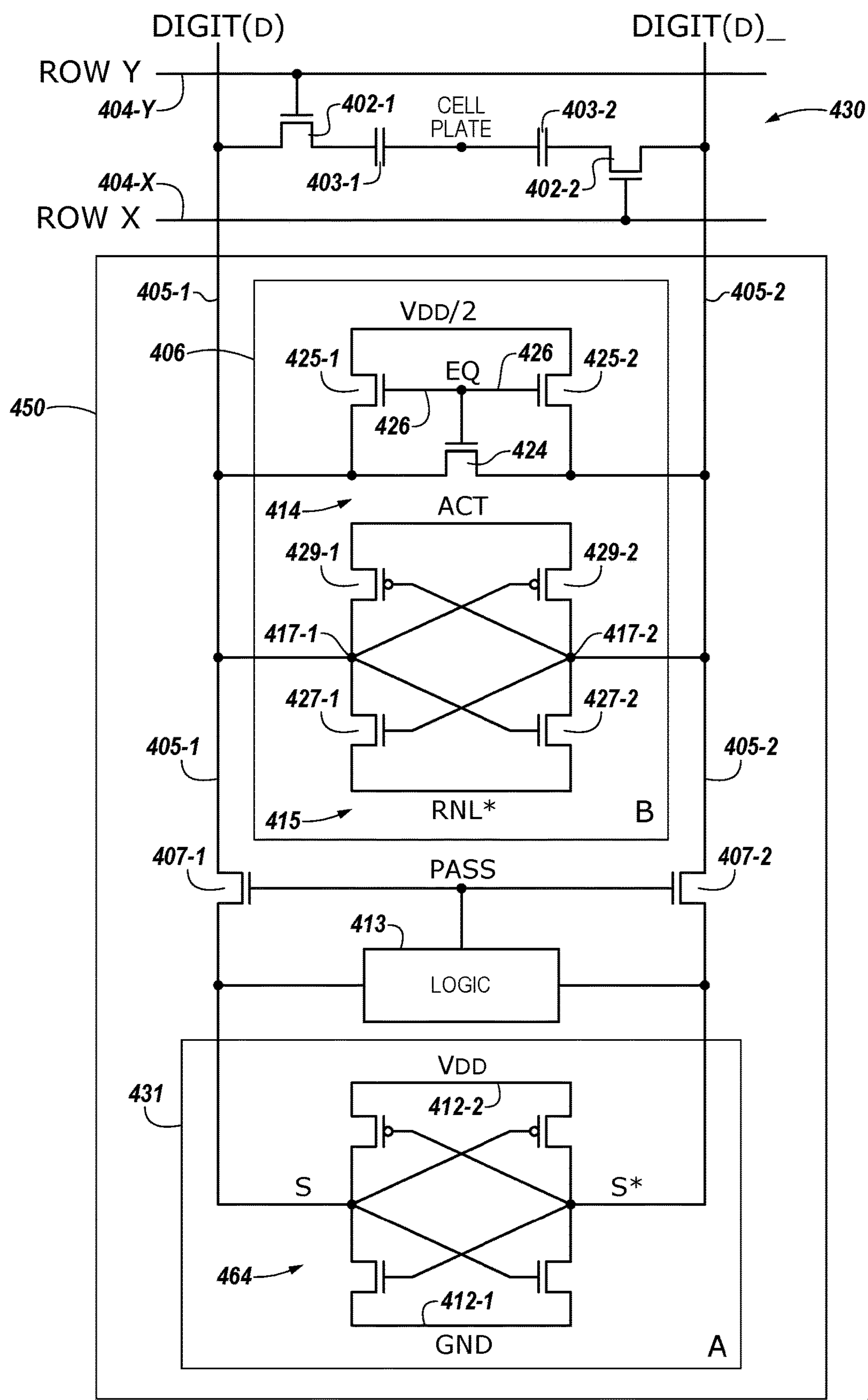
FIG. 4 is a schematic diagram illustrating sensing circuitry in accordance with a number of embodiments of the present disclosure.

FIG. 4 is a schematic diagram illustrating sensing circuitry 450 in accordance with a number of embodiments of the present disclosure. The sensing circuitry 450 can correspond to sensing circuitry 150 shown in FIG. 1 and can be controlled via microcode instructions in accordance with embodiments described herein.

In the example shown in FIG. 4, a memory cell can include a storage element (e.g., capacitor) and an access device (e.g., transistor). For instance, a first memory cell can include transistor 402-1 and capacitor 403-1, and a second memory cell can include transistor 402-2 and capacitor 403-2, etc. In this embodiment, the memory array 430 is a DRAM array of 1T1C (one transistor one capacitor) memory cells, although other cell configurations can be used (e.g., 2T2C with two transistors and two capacitors per memory cell). In a number of embodiments, the memory cells may be destructive read memory cells (e.g., reading the data stored in the cell destroys the data such that the data originally stored in the cell is refreshed after being read).

Figure 5:
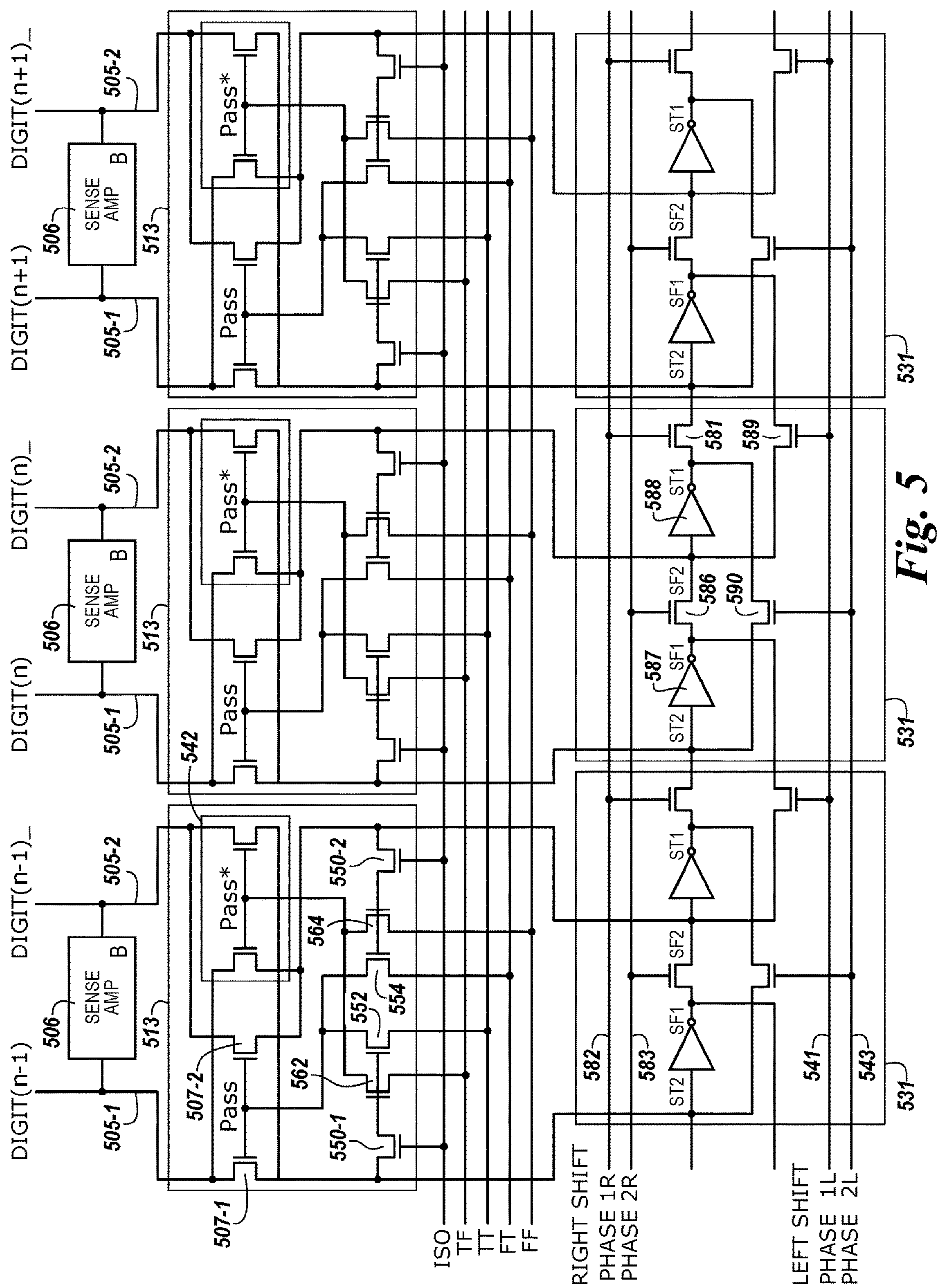
FIG. 5 is a schematic diagram illustrating sensing circuitry in accordance with a number of embodiments of the present disclosure.

The cells of the memory array 430 can be arranged in rows coupled by access (word) lines 404-X (ROW X), 404-Y (ROW Y), etc., and columns coupled by pairs of complementary sense lines (e.g., digit lines DIGIT(D) and DIGIT(D)_ shown in FIG. 4 and DIGIT_(n) and DIGIT_(n)_ shown in FIG. 5). The individual sense lines corresponding to each pair of complementary sense lines can also be referred to as digit lines 405-1 for DIGIT (D) and 405-2 for DIGIT (D)_, respectively. Although only one pair of complementary digit lines are shown in FIG. 4, embodiments of the present disclosure are not so limited, and an array of memory cells can include additional columns of memory cells and digit lines (e.g., 4,096, 8,192, 16,384, etc.).

Although rows and columns are illustrated as being orthogonal to each other, embodiments are not so limited. For example, the rows and columns may be oriented relative to each other in various other two-dimensional or three-dimensional configurations.

Memory cells can be coupled to different digit lines and word lines. For example, a first source/drain region of a transistor 402-1 can be coupled to digit line 405-1 (D), a second source/drain region of transistor 402-1 can be coupled to capacitor 403-1, and a gate of a transistor 402-1 can be coupled to word line 404-Y. A first source/drain region of a transistor 402-2 can be coupled to digit line 405-2 (D)_, a second source/drain region of transistor 402-2 can be coupled to capacitor 403-2, and a gate of a transistor 402-2 can be coupled to word line 404-X. A cell plate, as shown in FIG. 4, can be coupled to each of capacitors 403-1 and 403-2. The cell plate can be a common node to which a reference voltage (e.g., ground) can be applied in various memory array configurations.

The memory array 430 is configured to couple to sensing circuitry 450 in accordance with a number of embodiments of the present disclosure. In this embodiment, the sensing circuitry 450 comprises a sense amplifier 406 and a compute component 431 corresponding to respective columns of memory cells (e.g., coupled to respective pairs of complementary digit lines). The sense amplifier 406 can be coupled to the pair of complementary digit lines 405-1 and 405-2. The compute component 431 can be coupled to the sense amplifier 406 via pass gates 407-1 and 407-2. The gates of the pass gates 407-1 and 407-2 can be coupled to operation selection logic 413.

The operation selection logic 413 can be configured to include pass gate logic for controlling pass gates that couple the pair of complementary digit lines un-transposed between the sense amplifier 406 and the compute component 431 and swap gate logic for controlling swap gates that couple the pair of complementary digit lines transposed between the sense amplifier 406 and the compute component 431. The operation selection logic 413 can also be coupled to the pair of complementary digit lines 405-1 and 405-2. The operation selection logic 413 can be configured to control pass gates 407-1 and 407-2 based on a selected operation.

The sense amplifier 406 can be operated to determine a data value (e.g., logic state) stored in a selected memory cell. The sense amplifier 406 can comprise a cross coupled latch, which can be referred to herein as a primary latch. In the example illustrated in FIG. 4, the circuitry corresponding to sense amplifier 406 comprises a latch 415 including four transistors coupled to a pair of complementary digit lines D 405-1 and (D)_ 405-2. However, embodiments are not limited to this example. The latch 415 can be a cross coupled latch (e.g., gates of a pair of transistors) such as n-channel transistors (e.g., NMOS transistors) 427-1 and 427-2 are cross coupled with the gates of another pair of transistors, such as p-channel transistors (e.g., PMOS transistors) 429-1 and 429-2).

In operation, when a memory cell is being sensed (e.g., read), the voltage on one of the digit lines 405-1 (D) or 405-2 (D)_ will be slightly greater than the voltage on the other one of digit lines 405-1 (D) or 405-2 (D)_. An ACT signal and an RNL* signal can be driven low to enable (e.g., fire) the sense amplifier 406. The digit lines 405-1 (D) or 405-2 (D)_ having the lower voltage will turn on one of the PMOS transistor 429-1 or 429-2 to a greater extent than the other of PMOS transistor 429-1 or 429-2, thereby driving high the digit line 405-1 (D) or 405-2 (D)_ having the higher voltage to a greater extent than the other digit line 405-1 (D) or 405-2 (D)_ is driven high.

Similarly, the digit line 405-1 (D) or 405-2 (D)_ having the higher voltage will turn on one of the NMOS transistor 427-1 or 427-2 to a greater extent than the other of the NMOS transistor 427-1 or 427-2, thereby driving low the digit line 405-1 (D) or 405-2 (D)_ having the lower voltage to a greater extent than the other digit line 405-1 (D) or 405-2 (D)_ is driven low. As a result, after a short delay, the digit line 405-1 (D) or 405-2 (D)_ having the slightly greater voltage is driven to the voltage of the supply voltage $V_{CC}$ through a source transistor, and the other digit line 405-1 (D) or 405-2 (D)_ is driven to the voltage of the reference voltage (e.g., ground) through a sink transistor. Therefore, the cross coupled NMOS transistors 427-1 and 427-2 and PMOS transistors 429-1 and 429-2 serve as a sense amplifier pair, which amplify the differential voltage on the digit lines 405-1 (D) and 405-2 (D)_ and operate to latch a data value sensed from the selected memory cell.

Embodiments are not limited to the sense amplifier 406 configuration illustrated in FIG. 4. As an example, the sense amplifier 406 can be a current-mode sense amplifier and a single-ended sense amplifier (e.g., sense amplifier coupled to one digit line). Also, embodiments of the present disclosure are not limited to a folded digit line architecture such as that shown in FIG. 4.

The sense amplifier 406 can, in conjunction with the compute component 431, be operated to perform various operations using data from an array as input. In a number of embodiments, the result of an operation can be stored back to the array without transferring the data via a digit line address access (e.g., without firing a column decode signal such that data is transferred to circuitry external from the array and sensing circuitry via local I/O lines). As such, a number of embodiments of the present disclosure can enable performing operations using less power than various previous approaches. Additionally, since a number of embodiments eliminate the need to transfer data across local and global I/O lines and/or external data buses in order to perform compute functions (e.g., between memory and discrete processor), a number of embodiments can enable an increased (e.g., faster) processing capability as compared to previous approaches.

The sense amplifier 406 can further include equilibration circuitry 414, which can be configured to equilibrate the digit lines 405-1 (D) and 405-2 (D)_. In this example, the equilibration circuitry 414 comprises a transistor 424 coupled between digit lines 405-1 (D) and 405-2 (D)_. The equilibration circuitry 414 also comprises transistors 425-1 and 425-2 each having a first source/drain region coupled to an equilibration voltage (e.g., $V_{DD}/2$), where $V_{DD}$ is a supply voltage associated with the array. A second source/drain region of transistor 425-1 can be coupled digit line 405-1 (D), and a second source/drain region of transistor 425-2 can be coupled digit line 405-2 (D)_. Gates of transistors 424, 425-1, and 425-2 can be coupled together, and to an equilibration (EQ) control signal line 426. As such, activating EQ enables the transistors 424, 425-1, and 425-2, which effectively shorts digit lines 405-1 (D) and 405-2 (D)_ together and to the equilibration voltage (e.g., $V_{DD}/2$).

As described further below, in a number of embodiments, the sensing circuitry 450 (e.g., sense amplifier 406 and compute component 431) can be operated to perform a selected operation and initially store the result in one of the sense amplifier 406 or the compute component 431 without transferring data from the sensing circuitry via a local or global I/O line (e.g., without performing a sense line address access via activation of a column decode signal, for instance).

As shown in FIG. 4, the compute component 431 can also comprise a latch, which can be referred to herein as a secondary latch 464. The secondary latch 464 can be configured and operated in a manner similar to that described above with respect to the primary latch 415, with the exception that the pair of cross coupled p-channel transistors (e.g., PMOS transistors) included in the secondary latch can have their respective sources coupled to a supply voltage (e.g., $V_{DD}$), and the pair of cross coupled n-channel transistors (e.g., NMOS transistors) of the secondary latch can have their respective sources selectively coupled to a reference voltage (e.g., ground), such that the secondary latch is continuously enabled. The configuration of the compute component 431 is not limited to that shown in FIG. 4, and various other embodiments are feasible.

FIG. 5 is a schematic diagram illustrating sensing circuitry in accordance with a number of embodiments of the present disclosure. FIG. 5 illustrates a number of columns of an array each comprising a pair of complementary sense lines 505-1 and 505-2 coupled to a corresponding sense amplifier 506 and a compute component 531. The compute components 531 can be coupled to the sense amplifiers 506 via pass gates 507-1 and 507-2. The sense amplifiers 506 shown in FIG. 5 can correspond to sense amplifier 406 shown in FIG. 4. The sensing circuitry shown in FIG. 5 can correspond to sensing circuitry 150 shown in FIG. 1A, for example. The logical operation selection logic 513 shown in FIG. 5 can correspond to logical operation selection logic 413 shown in FIG. 4.

The gates of the pass gates 507-1 and 507-2 can be controlled by a logical operation selection logic signal, Pass. For example, an output of the logical operation selection logic can be coupled to the gates of the pass gates 507-1 and 507-2. The compute components 531 can latch respective data values, and can be operated as a shift register via shifting of the data values (e.g., right and/or left).

As an example, the compute components 531 can comprise respective stages (e.g., shift cells) of a shift register configured to shift data values left and/or right. For example, as illustrated in FIG. 5, each compute component 531 (e.g., stage) of the shift register comprises a pair of right-shift transistors 581 and 586, a pair of left-shift transistors 589 and 590, and a pair of inverters 587 and 588. The signals PHASE 1R, PHASE 2R, PHASE 1L, and PHASE 2L can be applied to respective control lines 582, 583, 541 and 543 to enable/disable feedback on the latches of the corresponding compute components 531 in association with performing logical operations and/or shifting data in accordance with embodiments described herein.

The sensing circuitry shown in FIG. 5 also shows a logical operation selection logic 513 coupled to a number of logic selection control input control lines, including ISO, TF, TT, FT, and FF. Selection of a logical operation from a plurality of logical operations is determined from the condition of logic selection control signals on the logic selection control input control lines, as well as the data values present on the pair of complementary sense lines 505-1 and 505-2 when the isolation transistors 550-1 and 550-2 are enabled via the ISO control signal being asserted.

According to various embodiments, the logical operation selection logic 513 can include four logic selection transistors: logic selection transistor 562 coupled between the gates of the swap transistors 542 and a TF signal control line, logic selection transistor 552 coupled between the gates of the pass gates 507-1 and 507-2 and a TT signal control line, logic selection transistor 554 coupled between the gates of the pass gates 507-1 and 507-2 and a FT signal control line, and logic selection transistor 564 coupled between the gates of the swap transistors 542 and a FF signal control line. Gates of logic selection transistors 562 and 552 are coupled to the true sense line through isolation transistor 550-1 (having a gate coupled to an ISO signal control line). Gates of logic selection transistors 564 and 554 are coupled to the complementary sense line through isolation transistor 550-2 (also having a gate coupled to an ISO signal control line).

Data values present on the pair of complementary sense lines 505-1 and 505-2 can be loaded into the compute component 531 via the pass gates 507-1 and 507-2. When the pass gates 507-1 and 507-2 are OPEN (e.g., conducting), data values on the pair of complementary sense lines 505-1 and 505-2 are passed to the compute components 531 (e.g., loaded into the shift register). The data values on the pair of complementary sense lines 505-1 and 505-2 can be the data value stored in the sense amplifier 506 when the sense amplifier is fired. The logical operation selection logic signal, Pass, is high to OPEN the pass gates 507-1 and 507-2.

The ISO, TF, TT, FT, and FF control signals can operate to select a logical function to implement based on the data value ("B") in the sense amplifier 506 and the data value ("A") in the compute component 531. In particular, the ISO, TF, TT, FT, and FF control signals are configured to select the logical function to implement independent from the data value present on the pair of complementary sense lines 505-1 and 505-2 (although the result of the implemented logical operation can be dependent on the data value present on the pair of complementary sense lines 505-1 and 505-2. That is, the ISO, TF, TT, FT, and FF control signals select the logical operation to implement directly since the data value present on the pair of complementary sense lines 505-1 and 505-2 is not passed through logic to operate the gates of the pass gates 507-1 and 507-2.

Additionally, FIG. 5 shows swap transistors 542 configured to swap the orientation of the pair of complementary sense lines 505-1 and 505-2 between the sense amplifier 506 and the compute component 531. When the swap transistors 542 are OPEN, data values on the pair of complementary sense lines 505-1 and 505-2 on the sense amplifier 506 side of the swap transistors 542 are oppositely-coupled to the pair of complementary sense lines 505-1 and 505-2 on the compute component 531 side of the swap transistors 542, and thereby loaded into the loadable shift register of the compute component 531.

The logical operation selection logic signal Pass can be activated (e.g., high) to OPEN the pass gates 507-1 and 507-2 when the ISO control signal line is activated and either the TT control signal is activated (e.g., high) and data value on the true sense line is "1" or the FT control signal is activated (e.g., high) and the data value on the complement sense line is "1."

The data value on the true sense line being a "1" OPENs logic selection transistors 552 and 562. The data value on the complementary sense line being a "1" OPENs logic selection transistors 554 and 564. If the ISO control signal or either the respective TT/FT control signal or the data value on the corresponding sense line (e.g., sense line to which the gate of the particular logic selection transistor is coupled) is not high, then the pass gates 507-1 and 507-2 will not be OPENed by a particular logic selection transistor.

The logical operation selection logic signal Pass* can be activated (e.g., high) to OPEN the swap transistors 542 (e.g., conducting) when the ISO control signal line is activated and either the TF control signal is activated (e.g., high) and data value on the true sense line is "1," or the FF control signal is activated (e.g., high) and the data value on the complement sense line is "1." If either the respective control signal or the data value on the corresponding sense line (e.g., sense line to which the gate of the particular logic selection transistor is coupled) is not high, then the swap transistors 542 will not be OPENed by a particular logic selection transistor.

The Pass* control signal is not necessarily complementary to the Pass control signal. It is possible for the Pass and Pass* control signals to both be activated or both be deactivated at the same time. However, activation of both the Pass and Pass* control signals at the same time shorts the pair of complementary sense lines together, which may be a disruptive configuration to be avoided.

The sensing circuitry illustrated in FIG. 5 is configured to select one of a plurality of logical operations to implement directly from the four logic selection control signals (e.g., logical operation selection is not dependent on the data value present on the pair of complementary sense lines). Some combinations of the logic selection control signals can cause both the pass gates 507-1 and 507-2 and swap transistors 542 to be OPEN at the same time, which shorts the pair of complementary sense lines 505-1 and 505-2 together. According to a number of embodiments of the present disclosure, the logical operations which can be implemented by the sensing circuitry illustrated in FIG. 5 can be the logical operations summarized in the logic tables shown in FIG. 6.

FIG. 6 is a logic table illustrating selectable logic operation results implemented by a sensing circuitry shown in FIG. 5 in accordance with a number of embodiments of the present disclosure. The four logic selection control signals (e.g., TF, TT, FT, and FF), in conjunction with a particular data value present on the complementary sense lines, can be used to select one of plural logical operations to implement involving the starting data values stored in the sense amplifier 506 and compute component 531. The four control signals, in conjunction with a particular data value present on the complementary sense lines, controls the states of the pass gates 507-1 and 507-2 and swap transistors 542, which in turn affects the data value in the compute component 531 and/or sense amplifier 506 before/after firing. The capability to selectably control states of the swap transistors 542 facilitates implementing logical operations involving inverse data values (e.g., inverse operands and/or inverse result), among others.

Logic Table 6-1 illustrated in FIG. 6 shows the starting data value ("A") stored in the compute component 531 shown in column 644, and the starting data value ("B") stored in the sense amplifier 506 shown in column 645. The other 3 column headings in Logic Table 6-1 refer to the states of the pass gates 507-1 and 507-2, and the swap transistors 542, which can respectively be controlled to be OPEN (e.g., conducting) or CLOSED (e.g., not conducting) depending on the state of the four logic selection control signals (e.g., TF, TT, FT, and FF), in conjunction with a particular data value present on the pair of complementary sense lines 505-1 and 505-2. The "NOT OPEN" column corresponds to the pass gates 507-1 and 507-2 and the swap transistors 542 both being in a non-conducting condition, the "OPEN TRUE" corresponds to the pass gates 507-1 and 507-2 being in a conducting condition, and the "OPEN INVERT" corresponds to the swap transistors 542 being in a conducting condition. The configuration corresponding to the pass gates 507-1 and 507-2 and the swap transistors 542 both being in a conducting condition is not reflected in Logic Table 6-1 since this results in the sense lines being shorted together.

Via selective control of the pass gates 507-1 and 507-2 and the swap transistors 542, each of the three columns of the upper portion of Logic Table 6-1 can be combined with each of the three columns of the lower portion of Logic Table 6-1 to provide 3×3=9 different result combinations, corresponding to nine different logical operations, as indicated by the various connecting paths shown at 675. The nine different selectable logical operations that can be implemented by the sensing circuitry, e.g., 150 in FIG. 1A, are summarized in Logic Table 6-2 illustrated in FIG. 6, including an XOR logical operation.

The columns of Logic Table 6-2 illustrated in FIG. 6 show a heading 680 that includes the state of the logic selection control signals (FF, FT, TF and TT). For example, the state of a first logic selection control signal is provided in row 676, the state of a second logic selection control signal is provided in row 677, the state of a third logic selection control signal is provided in row 678, and the state of a fourth logic selection control signal is provided in row 679. The particular logical operation corresponding to the results is summarized in row 647.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:

a processing resource configured to execute a microcode instruction, the microcode instruction comprising:

a number of type select data units, wherein each value of the number of type select data units corresponds to a respective one of a number of instructions types; and a number of control data units whose functions are variable based on a respective instruction type indicated by a value of the number of type select data units; and the processing resource further configured to, when the microcode instruction is executed, control a component within or outside of the processing resource based at least in part on a respective instruction type indicated by a value of the number of type select data units.

2. The apparatus of claim 1, wherein the processing resource is a processor of a host, the processor configured to control the component outside of the processor to further control input/output (I/O) operations between a number of memory devices and the host.

3. The apparatus of claim 1, wherein the component within the processing resource comprises a program counter, a register, or an arithmetic log unit (ALU), or any combination thereof.

4. The apparatus of claim 1, wherein the processing resource is configured to, when the microcode instruction is executed:

control the component within the processing resource in response to:

a data unit of the number of control data units having a particular value; and the number of type select data units having a first value; and control the component outside of the processing resource in response to:

the same data unit of the number of control data units having the particular value; and the number of type select data units having a second value.

5. An apparatus, comprising:

a controller configured to store a number of microcode instructions, wherein each of the number of microcode instructions comprises a number of type select bits and a number of control data units, wherein:

when a value of the number of type select bits in a particular one of the microcode instructions is a first value, then the particular microcode instruction is of a first instruction type and a value of the number of control data units is used to control a component within the controller; and when the value of the number of type select bits in the particular one of the microcode instructions is a second value, then the particular microcode instruction is of a second instruction type and the value of the number of control data units is used to control the component outside of the controller.

6. The apparatus of claim 5, wherein the component within the controller is a register of the controller.

7. The apparatus of claim 5, wherein the component within the controller is an arithmetic logic unit (ALU) of the controller.

8. The apparatus of claim 5, wherein the controller comprises a cache configured to store the number of microcode instructions, and the controller further comprises a sequencer and timing circuitry.

9. The apparatus of claim 5, wherein the component outside of the controller comprises sensing circuitry of a memory device.

10. The apparatus of claim 9, wherein the controller comprises a controller of the memory device.

11. The apparatus of claim 5, wherein the component outside of the controller comprises logic of a memory device.

12. The apparatus of claim 5, wherein the component outside of the controller comprises decode circuitry of a memory device.

13. The apparatus of claim 5, wherein the controller is configured to fetch one or more of the number of microcode instructions from a memory array of a memory device.

14. The apparatus of claim 5, wherein the controller is configured to fetch one or more of the number of microcode instructions from a host.

15. A system, comprising:

a controller configured to execute a microcode instruction, the microcode instruction comprising:

a number of type select data units, wherein each value of the number of type select data units corresponds to a respective one of a number of instruction types; and a number of control data units whose functions are variable based on a respective instruction type indicated by a value of the number of type select data units;

the controller further configured to, when the microcode instruction is executed:

responsive to a value of the number of types select data units indicating a first instruction type, control a component within the controller based on a value of at least one of the number of control data units; and responsive to a value of the number of types select data units indicating a second instruction type, control a component outside of the controller based on a value of the at least one of the number of control data units and a value of the number of type select data units indicating a second instruction type.

16. The system of claim 15, wherein the controller further comprises, for execution of the microcode instruction, a program counter, a register, an arithmetic logic unit (ALU), a branching logic, or a state machine, or any combination thereof.

17. The system of claim 15, wherein the at least one of the components within controller comprises an arithmetic logic unit (ALU) or a register, or both.

18. The system of claim 15, wherein the at least one of the components outside of the controller comprises sensing circuitry, logic circuitry, or decode circuitry, or combination thereof.

19. The system of claim 15, wherein:

the controller is further coupled to sensing circuitry that is coupled to an array of memory cells; and the controller further comprises timing circuitry to coordinate timing between execution of a microcode instruction associated with performing one or more logical operations using the sensing circuitry and execution of a microcode instruction associated with transferring data from the array to the controller.

20. The system of claim 19, wherein the timing circuitry further comprises a state machine, a first-in, first-out (FIFO) buffer, a row address strobe chain interface, or any combination thereof.

* * * * *